May 30, 1967   R. H. WRIGHT   3,323,040
COMBINED PICK-OFF AND TORQUER HAVING TORQUING SIGNAL
SUPERIMPOSED ON EXCITATION OR PICK-OFF WINDING
Filed Jan. 24, 1964
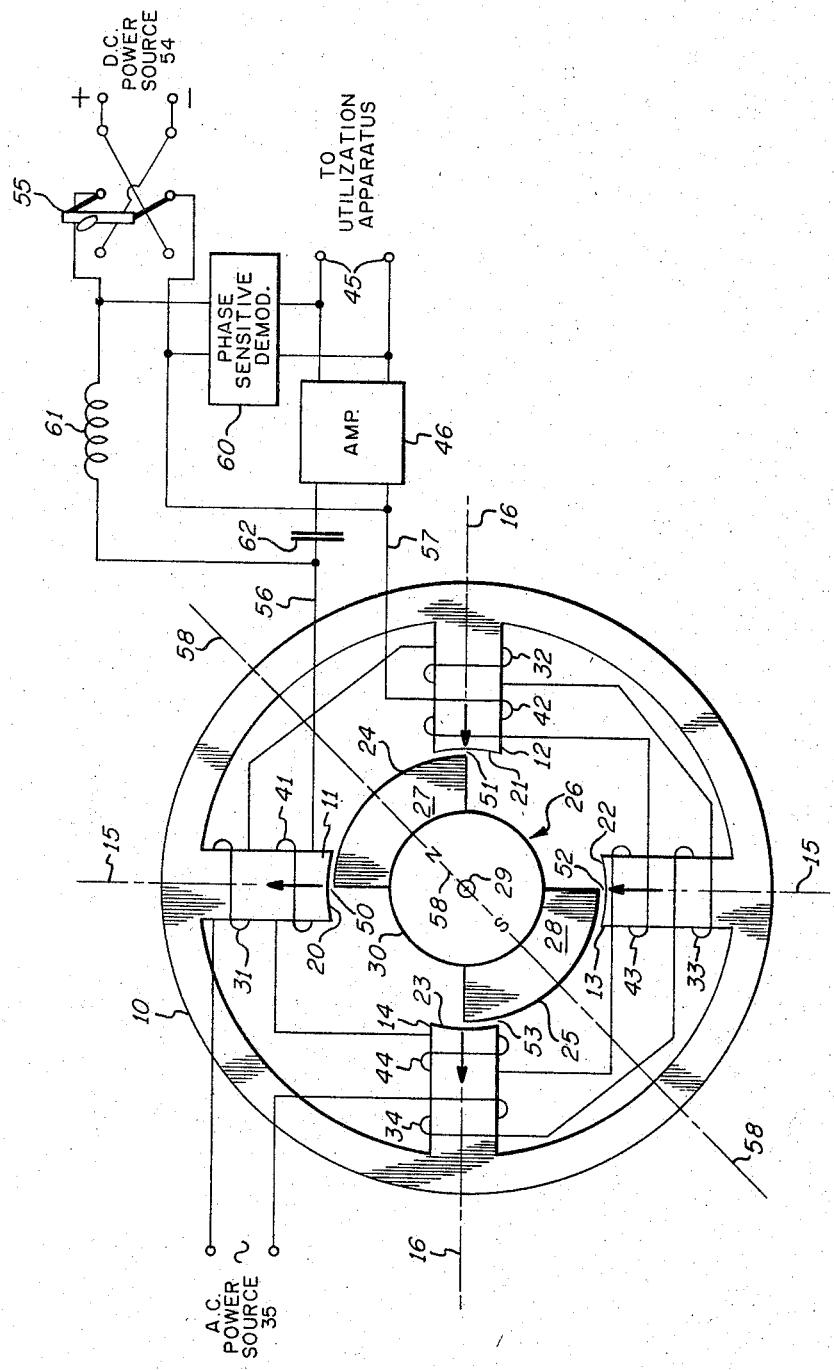
INVENTOR.
RONALD H. WRIGHT
BY
ATTORNEY

United States Patent Office 3,323,040
Patented May 30, 1967

3,323,040
COMBINED PICK-OFF AND TORQUER HAVING TORQUING SIGNAL SUPERIMPOSED ON EXCITATION OR PICK-OFF WINDING
Ronald H. Wright, Commack, N.Y., assignor to Sperry Rand Corporation, Great Neck, N.Y., a corporation of Delaware
Filed Jan. 24, 1964, Ser. No. 340,027
6 Claims. (Cl. 323—51)

The present invention relates to electromagnetic transducer devices of the type which provide the dual function of a signal generator to provide an electrical signal in accordance with the movement between the relative parts thereof and also a torquer to provide movement between the relative parts thereof representative of an electrical signal applied thereto. The invention is particularly applicable to apparatus having sensitive elements such as accelerometers and gyroscopes.

Prior art type of combined pick-off and torquing devices such as that shown in U.S. Patent 2,710,941, issued June 14, 1955 to C. R. Bonnell, require at least an excitation winding, a pick-off winding and a torquing winding and in many instances, a plurality of torquing windings are required as disclosed in said Patent 2,710,941. This results in pickoff and torquing apparatus which is unduly complex with undesirable interaction between the pick-off and torquing functions.

It is therefore a primary object of the present invention to provide a combined pick-off and torquing device which is simple and inexpensive to manufacture while providing an accurate output signal.

It is a further object of the present invention to provide a combined pick-off and torquing device in which at least one of the windings serves a dual function in order to minimize the number and complexity of the windings.

It is an additional object of the present invention to provide a combined pick-off and torquing apparatus wherein the torquing signal is applied through either the pick-off or excitation winding thereby eliminating at least one set of windings.

The above and other objects of the present invention are achieved by the combined pick-off and torquer of the present invention which consists of a substantially annular stator having two pairs of oppositely disposed inwardly extending poles whose axes are perpendicular and a rotor having a permanent magnet disposed in the space between the poles for movement about an axis perpendicular to the axes of said poles. An A.C. excitation winding is mounted on each of the poles in series while the pick-off windings are mounted on the poles in series, in opposition, so that with the rotor at a null or reference position the output voltage is zero. The D.C. torquing input signal may be applied to either the pick-off windings or the excitation windings to produce magnetic flux which cooperates with the flux from said permanent magnet for positioning the rotor. To prevent undesirable interaction between the torquing and pick-off signals, an A.C. choke is connected between the D.C. torquing input signal and the particular windings and a D.C. blocking capacitor is connected between said windings and the A.C. output signal terminals.

Further objects will appear from the following specification and claims when read in conjunction with the drawing which is a schematic view of the combined pick-off and torquing device of the present invention.

Referring to the drawing, the combined pick-off and torquing apparatus includes a stator element 10 having four oppositely disposed inwardly extending poles 11, 12, 13 and 14, respectively. The poles 11 and 13 form one pair of oppositely disposed poles having an axis 15 which is perpendicular to the axis 16 of the other pair of oppositely disposed poles 12 and 14. Preferably, the stator 10 is made of soft iron magnetic laminated material. The inwardly-extending extremities of the pole pieces 11, 12, 13 and 14 are arcuate shaped to form stator pole faces 20, 21, 22 and 23, respectively, which cooperate with the corresponding arcuate shaped rotor pole faces 24 and 25 of a bipolar dumbbell shaped rotor 26 having rotor poles 27 and 28 respectively. The rotor 26 is mounted for angular movement between the poles 11, 12, 13, and 14 about an axis 29 perpendicular to the axes 15 and 16. The rotor 26 may, for example, be attached to the movable gimbal of a gyroscope while the stator 10 may be mounted on the stationary housing of the gyroscope, neither of which are shown, to provide pick-off and torquing functions with respect to the relatively movable gimbal and housing. Normally, the rotor 26 is arranged for limited angular movement with respect to the stator 10. The faces 24 and 25 of the rotor poles 27 and 28 respectively subtend or span substantially the distance between the center lines of the adjacent stator pole faces 20 and 21, and 22 and 23, respectively, as viewed in the drawing. The poles 27 and 28 are made of a magnetic material and in accordance with the present invention they are mounted on diametrically opposed portions of a substantially disc shaped permanent magnet 30 which is concentric with the axis 29 to form an integral rotor unit 26. Alternatively, the permanent magnet 30 may be imbedded concentrically within the rotor 26.

The primary windings are mounted on each of the poles 11, 12, 13, and 14 in the form of excitation windings 31, 32, 33, and 34, respectively, which are connected in series to an alternating current source of power 35 indicated by the legend. Secondary windings in the form of pick-off windings 41, 42, 43 and 44 are mounted on respective poles 11, 12, 13 and 14 in series, in opposition, so that with the rotor 26 at its null or preferred position, as shown in the drawing, the pick-off output signal voltage as amplified by amplifier 46 is zero from the pick-off output terminals 45 which are connected to utilization apparatus as indicated by the legend.

The pick-off portion operates in a conventional manner to provide an output signal from the terminals 45 that is representative of the displacement of the rotor 26 from its null position as shown. The pick-off operates on the variable reluctance principle in that the changes in the output voltage are due to changes in the reluctance path of the magnetic circuit consisting of the relationship of the rotor pole faces 24 and 25 with respect to the cooperative stator pole faces 20, 21, 22, and 23 of the stator 10 and the air gap resulting therefrom. In the null position shown, the rotor pole face 24 covers approximately one-half of each of the stator pole faces 20 and 21 thereby forming air gaps 50 and 51 therebetween respectively while the rotor pole face 25 covers approximately one-half of each of the stator pole faces 22 and 23 thereby forming air gaps 52 and 53 therebetween respectively. The magnetic path for the magnetic flux generated by the excitation windings 31, 32, 33 and 34 is through the high-permeability magnetic material in the stator 10 and rotor 26 and the air gaps 50, 51, 52, and 53 which have low permeability. Therefore, any change in the total reluctance of these series paths is almost all due to the change in the reluctance of the air gaps 50, 51, 52 and 53. A change in the reluctance due to movement of the rotor 26 results in a proportional change in the amount of flux linking the pick-off windings 41, 42, 43 and 44. As the highly permeable rotor 26 rotates away from the null position the reluctance between opposite stator poles will vary such that the magnetic field will see the lowest reluctance between the stator poles towards which the rotor 26 moves. For example, if the rotor 26 rotated clockwise as viewed in the drawing away from the null position shown, the reluctance would decrease between the horizontal stator poles 12 and 14 and increase between the vertical stator poles 11 and 13. The pick-off windings 41, 42, 43 and 44, which are wound so that the induced currents in oppositely disposed stator poles add, will sense the change in reluctance and produce a pick-off output signal at the same frequency as the input but with an amplitude and phase proportional to the amount and direction respectively of the angular displacement of the rotor 26 from its null position.

In order to provide a torquing function while utilizing a minimum of windings, a D.C. torquing input signal is applied to the pick-off or excitation windings. For purposes of example, the present invention will be described with respect to a torquing signal applied to the pick-off windings 41, 42, 43 and 44 in order that the pick-off windings serve the additional function of supplying a magnetic field which cooperates with the magnetic field emanating from the permanent magnet 30 in the rotor 26 thereby applying a torque to the rotor 26.

To accomplish this, a D.C. torquing input signal is connected from a D.C. power source 54 as indicated by the legend through a reversing switch 55 to the output leads 56 and 57 of the pick-off windings 41, 42, 43, and 44. The D.C. torquing input signal applied across the pick-off windings produces a magnetic field which is orthogonal to the north-south axis 58 of the permanent magnet 30 when the north-south axis 58 is intercardinally disposed between the stator pole pieces 11 and 12 as shown. The arrows drawn on the stator poles 11, 12, 13 and 14 represent the magnetic field which is created by the D.C. torquing input signal. The vector sum of the field created by the D.C. signal is at 90° to the north-south axis 58. The permanent magnet 30 will try to align itself with the induced magnetic field thus producing a torque on the rotor 26 which is controlled in magnitude and direction in accordance with the magnitude and polarity of the D.C. input signal. By operating the pick-off and torquing apparatus in a closed loop, for example, by connecting the output of the amplifier 46 to a phase sensitive demodulator 60 which in turn is connected to the pick-off leads 56 and 57 or by means of a conventional external servo loop (not shown), the movement of the rotor 26 is limited to only a few minutes of arc thereby causing the rotor 26 to operate around the null position where the torque gradient is the most linear.

To prevent cross coupling between the D.C. torquing input signal and the A.C. pick-off output signal, an inductor or choke 61 and a capacitor 62 are employed. The inductor 61 is connected between the D.C. input signal and the pick-off lead 56 to pass the D.C. input signal while presenting a high impedance to the high frequency A.C. output signal. The capacitor 62 is connected in the lead 56 between the D.C. input signal junction and the amplifier 46 to pass the high frequency A.C. signal while blocking the D.C. signal.

One of the features of the present invention is that the field produced by the D.C. torquing input signal and the permanent magnet 30 will not effect the A.C. pick-off output signal since the rotor 26 moves through a very small angle and the D.C. field is fixed thus creating no moving flux lines.

It will be appreciated that the D.C. torquing input signal may alternatively be connected to the excitation windings 31, 32, 33 and 34 through an appropriate inductor and capacitor arrangement providing the rotor 26 and the north-south axis 58 of the permanent magnet 30 are disposed 90° with respect to the position shown.

It will be further appreciated that when used with a displacement type gyroscope, the pick-off signal from the amplifier 46 is usually connected to torque the relatively movable gimbal and housing assembly of the gyroscope toward a predetermined relationship by means of an external servo loop and independent torquing signals of a compensating nature constitute the torquing input signal.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:
1. A combined pick-off and torquing device comprising,
 (1) stator means having excitation winding means mounted thereon for producing a periodically varying field of substantially parallel lines of magnetic flux,
 (2) conductive rotor means having a substantially disc shaped permanent magnet mounted to be cooperative with said lines of flux for angular movement about an axis perpendicular to said lines of flux, said rotor means being shaped for varying the reluctance to said lines of flux in accordance with the deviation of said rotor from a predetermined preferred position,
 (3) pick-off winding means mounted on said stator means for providing output signals having an amplitude and phase representative of the amount and direction of the deviation of said rotor means from said predetermined position,
 (4) means for providing a variable direct current torquing input signal connected to one of said winding means for generating magnetic lines of flux cooperative with said permanent magnet for applying a torque to said rotor means representative of the magnitude and polarity of said torquing input signal, and
 (5) means coupled to said one of said winding means for preventing undesirable interaction between said signals.

2. A combined pick-off and torquing device comprising,
 (1) a substantially annular stator having two pairs of oppositely disposed inwardly extending poles, the axis of said pairs of poles being substantially perpendicular,
 (2) stator excitation winding means mounted on said poles for producing a flow of periodically varying flux between at least two of said poles,
 (3) a source of periodically varying excitation signals for energizing said excitation winding means,
 (4) rotor means including a substantially disc shaped permanent magnet and two spaced diametrically disposed polar projections of magnetic material extending from said magnet and spanning substantially the angle between the centers of adjacent poles, said rotor means being rotatable about an axis perpendicular to said axes of said pairs of poles,
 (5) pick-off winding means mounted on at least two of said poles for providing a pick-off output signal representative of the movement of said rotor means from a predetermined position,
 (6) a direct current source of power for providing a variable direct current torquing input signal,
 (7) one of said excitation and pick-off winding means being responsive to said torquing input signal for providing magnetic fluxes cooperative with the flux from said permanent magnet for applying a torque to said rotor means representative of the magnitude and polarity of said torquing input signal, and
 (8) means coupled to said one of said excitation and pick-off winding means for preventing undesirable interaction between said signals.

3. A combined pick-off and torquing device comprising,
 (1) stator means having two pairs of oppositely disposed inwardly extending poles, the axes of said pairs of poles being substantially perpendicular, (2) an alternating current source of power,
(3) excitation windings connected to said alternating current source and mounted on said poles for providing magnetic fluxes across the gaps between the poles of each of said pair of poles.
(4) rotor means having a substantially disc shaped permanent magnet and two spaced diametrically disposed polar projections of magnetic material extending from said magnet and spanning substantially the angle between centers of adjacent poles, said rotor means being disposed between said stator poles and rotatable about an axis perpendicular to said axes of said pairs of poles,
(5) common pick-off torquing windings mounted on said poles in series opposition for interaction with said fluxes for providing a pick-off output signal representative of the movement of said rotor means from a predetermined position,
(6) a direct current source of power for providing a variable torquing input signal,
(7) said common pick-off torquing windings being responsive to said torquing input signal for providing magnetic fluxes that are cooperative with the flux from said permanent magnet for applying a torque to said rotor means representative of the magnitude and polarity of said torquing input signal, and
(8) means coupled to said common pick-off-torquing windings for preventing undesirable interaction between said pick-off and torquing signals.

4. A combined pick-off and torquing device of the character recited in claim 3 in which said last mentioned means includes inductive means coupled to said common pick-off-torquing windings for blocking undesirable alternating current signals and capacitive means coupled to said common pick-off-torquing windings for blocking undesirable direct current signals.

5. A combined pick-off and torquing device comprising,
(1) stator means having two pairs of oppositely disposed inwardly extending poles, the axes of said pairs of poles being substantially perpendicular,
(2) an alternating current source of power,
(3) common excitation-torquing windings connected to said alternating current source and mounted on said poles for providing magnetic fluxes across the gaps between the poles of each of said pair of poles,
(4) rotor means having a substantially disc shaped permanent magnet and two spaced diametrically disposed polar projections of magnetic material extending from said magnet and spanning substantially the angle between centers of adjacent poles, said rotor means being disposed between said stator poles and rotatable about an axis perpendicular to said axes of said pairs of poles,
(5) pick-off windings mounted on said poles in series in opposition for interaction with said fluxes for providing a pick-off output signal representative of the movement of said rotor means from a predetermined position,
(6) a direct current source of power for providing a variable torquing input signal,
(7) said common excitation-torquing windings being responsive to said torquing input signal for providing magnetic fluxes that are cooperative with the flux from said permanent magnet for applying a torque to said rotor means representative of the magnitude and polarity of said torquing input signal, and
(8) means coupled to said common excitation-torquing windings for preventing undesirable interaction between said excitation and torquing signals.

6. A combined pick-off and torquing device of the character recited in claim 5 in which said last mentioned means includes inductive means coupled to said common excitation-torquing windings for blocking undesirable alternating current signals and capacitive means coupled to said common excitation-torquing windings for blocking undesirable direct current signals.

References Cited
UNITED STATES PATENTS

| | | | |
|---|---|---|---|
| 2,710,941 | 6/1955 | Bonnell | 323—90 |
| 2,946,226 | 7/1960 | Wendt et al. | 73—517 |
| 2,947,176 | 8/1960 | Perry | 73—517 |
| 3,195,039 | 7/1965 | Koning | 323—51 |

JOHN F. COUCH, *Primary Examiner.*

A. D. PELLINEN, *Assistant Examiner.*